(12) United States Patent
Alba et al.

(10) Patent No.: US 7,809,711 B2
(45) Date of Patent: Oct. 5, 2010

(54) SYSTEM AND METHOD FOR SEMANTIC ANALYSIS OF INTELLIGENT DEVICE DISCOVERY

(75) Inventors: Alfredo Alba, Morgan Hill, CA (US); Varun Bhagwan, San Jose, CA (US); Daniel Frederick Gruhl, San Jose, CA (US); Savitha Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 11/422,055

(22) Filed: Jun. 2, 2006

(65) Prior Publication Data

US 2007/0282799 A1 Dec. 6, 2007

(51) Int. Cl.
G06F 7/00 (2006.01)
G06F 17/30 (2006.01)

(52) U.S. Cl. .................. 707/709; 707/722; 707/737; 707/739; 707/758

(58) Field of Classification Search .................. None
See application file for complete search history.

(56) References Cited

U.S. PATENT DOCUMENTS

| | | | |
|---|---|---|---|
| 6,029,175 A | 2/2000 | Chow et al. | |
| 6,516,308 B1 | 2/2003 | Cohen | |
| 6,606,619 B2 * | 8/2003 | Ortega et al. ............... | 707/2 |
| 6,721,728 B2 | 4/2004 | McGreevy | |
| 6,735,678 B2 | 5/2004 | Noble et al. | |
| 6,741,981 B2 | 5/2004 | McGreevy | |
| 6,789,077 B1 | 9/2004 | Slaughter et al. | |
| 6,868,447 B1 | 3/2005 | Slaughter et al. | |
| 6,944,657 B1 | 9/2005 | Taghadoss | |
| 6,950,821 B2 | 9/2005 | Faybishenko et al. | |
| 6,973,493 B1 | 12/2005 | Slaughter et al. | |
| 7,095,871 B2 * | 8/2006 | Jones et al. ............... | 382/100 |
| 7,162,691 B1 * | 1/2007 | Chatterjee et al. .......... | 715/205 |
| 7,499,965 B1 * | 3/2009 | Chai ........................ | 709/202 |
| 2003/0212779 A1 * | 11/2003 | Boyter et al. .............. | 709/223 |
| 2004/0133557 A1 * | 7/2004 | Wen et al. .................. | 707/3 |
| 2005/0165778 A1 * | 7/2005 | Obata et al. ................ | 707/5 |

(Continued)

OTHER PUBLICATIONS

"Lexical and Semantic Clustering by Web Links", by Menczer, Journal of the American Society for Information Science and Technology, 55(14): 1261-1269, 2004.*

(Continued)

Primary Examiner—Jay A Morrison
(74) Attorney, Agent, or Firm—Leonard T. Guzman

(57) ABSTRACT

The present invention provides a method, system, and service of analyzing electronic documents in an intranet, where the intranet includes a plurality of web sites. In an exemplary embodiment, the method, system, and service include (1) crawling HTML content and text content in a set of the sites, (2) deep-scanning non-HTML content and non-text content in the set of sites, (3) reverse-scanning the set of sites, (4) performing a semantic analysis of the crawled content and the deep-scanned content, (5) correlating the results of the semantic analysis with the results of the reverse-scanning, and (6) comparing user navigation patterns and content from the members of the set of sites. In a further embodiment, the method, system, and service further include combining the results of the performing, the results of the correlating, and the results of the comparing.

22 Claims, 11 Drawing Sheets

U.S. PATENT DOCUMENTS

2007/0022085 A1* 1/2007 Kulkarni .................... 707/1

OTHER PUBLICATIONS

Broder, A. Z. "Identifying and Filtering Near-Duplicate Documents" Combinatorial Pattern Matching: 11TH Annual Symposium, CPM 2000, Montreal, Canada, Jun. 21-23, 2000. Proceedings (Lecture Notes in Computer Science, Springer Verlag), [Online] vol. 1848/2000, Jun. 21, 2000, XP002462003 Montreal, Canada http://www.springerlink.com/content/ktn2lyjul3r379xy/fulltext.pdf>.

Shiri, A. et al. "Interfaces to Knowledge Organization Systems in Canadian Digital Library Collections" Online Information Review Emerald UK, [Online] vol. 29, Nov. 6, 2005, pp. 604-620.

* cited by examiner

SYSTEM AND METHOD FOR SEMANTIC ANALYSIS OF INTELLIGENT DEVICE DISCOVERY

FIELD OF THE INVENTION

The present invention relates to intranets, and particularly relates to a method, a system, and a service of analyzing electronic documents in an intranet.

BACKGROUND OF THE INVENTION

Automated tools to manage an enterprise's information technology (IT) infrastructure (i.e., intranet) efficiently are a necessity in today's computing environment.

Need for Analyzing Electronic Documents in an Intranet

Large corporations typically have thousands to tens of thousands of servers that serve content over their intranet. Typically, the cost of managing, maintaining and administering each of these servers comes to tens of thousands of dollars per year. A reduction in the number of servers here gives tremendous savings, up to several hundred thousand dollars per year. Such cost savings can be achieved by performing a semantic analysis of the content residing on servers on an intranet.

This results in a need for analyzing electronic documents in such intranets. Namely, there is a need to analyze the content (unstructured and structured) that sits across an enterprises' servers (i.e., web sites), managed by various business units within the enterprise.

Challenges in Analyzing Electronic Documents in an Intranet

The number of servers in any large enterprise deems manual analysis infeasible. Large enterprises typically have thousands to tens of thousands of sites that serve content over their intranets. For example, a particular large computer company has on the order of 50,000 sites with intranet content, and spends $5 billion annually on its IT infrastructure, out of which roughly $500 million is spent on web hosting sites.

Automated semantic analysis of this content poses multiple challenges, such as those of fetching this content from tens of thousands of servers, storing, annotating & indexing this content, and finally performing analysis of content based on the annotations.

Also, many sites choose not to expose different document-types by means of a robots.txt file on the site. For instance, such sites may forbid crawls for anything under the "image" directory. However, on certain sites, the robots.txt files may be used specifically to block duplicate data from showing up. Thus, for such sites, honoring the robots.txt files would ensure that the duplicate content is never identified.

PRIOR ART SYSTEMS

One prior art system is a network device discovery tool. Such tools are frequently used to manage an intranet is network device discovery tools. Such network-based IT asset discovery and categorization tools typically combine various discovery, scanning, and traffic analysis programs with distributed automation and data mining techniques. Such tools are often used to perform auto-discovery on corporate infrastructures, for reconciliation of system counts in large existing customer contracts, and for network documentation and infrastructure vulnerability assessment.

Such tools provide a baseline for infrastructure consolidation, business optimization, and IT audit and governance projects. As shown in prior art FIG. 1, such a tool (a) performs network topology discovery and (b) gather information about the network by using simple network management protocol (SNMP) (e.g. the traceroute and ping tools). However, such tools are unable to analyze electronic documents in an intranet.

In addition, prior art systems do not perform semantic analysis or discovery targeting an enterprise's server infrastructure and do not perform the discovery and semantic analysis at a per-server level to drive efficiencies in the infrastructure.

Therefore, a method, system, and service of analyzing electronic documents in an intranet is needed.

SUMMARY OF THE INVENTION

The present invention provides a method, system, and service of analyzing electronic documents in an intranet, where the intranet includes a plurality of web sites. In an exemplary embodiment, the method, system, and service include (1) crawling HTML content and text content in a set of the sites, (2) deep-scanning non-HTML content and non-text content in the set of sites, (3) reverse-scanning the set of sites, (4) performing a semantic analysis of the crawled content and the deep-scanned content, (5) correlating the results of the semantic analysis with the results of the reverse-scanning, and (6) comparing user navigation patterns and content from the members of the set of sites. In a further embodiment, the method, system, and service further include combining the results of the performing, the results of the correlating, and the results of the comparing.

In an exemplary embodiment, if the text content for a member of the set of sites is greater than one megabyte, the deep-scanning includes (a) crawling the first megabyte of the text content of the member and (b) using the first megabyte of the text content of the member for hash generation. In an exemplary embodiment, the reverse-scanning includes (a) clustering the members of the set of sites into sitename-based sets, (b) for each of the sitename-based sets, generating a list of Internet Protocol (IP) addresses with open http ports in the same subnet as the sitename-based set, and (c) for each of the sitename-based sets, scanning all IP addresses for the members of the sitename-based set.

In an exemplary embodiment, the performing includes performing exact duplicate detection on the text content of each member of the set of sites. In an exemplary embodiment, the performing includes performing near-duplicate detection on the text content of each member of the set of sites. In an exemplary embodiment, the performing includes performing main topics detection on the text content of each member of the set of sites. In an exemplary embodiment, the performing includes aggregating topics in the text content of each member of the set of sites by organizational structure. In an exemplary embodiment the combining includes listing the combined results in descending order of duplicate content.

In an exemplary embodiment, the method, system, and service include (1) crawling HTML content and text content in a set of the sites, (2) deep-scanning non-HTML content and non-text content in the set of sites, (3) reverse-scanning the set of sites, (4) performing a semantic analysis of the crawled content and the deep-scanned content, (5) correlating the results of the semantic analysis with the results of the reverse-scanning, (6) comparing user navigation patterns and content from the members of the set of sites, and (7) combining the results of the performing, the results of the correlating, and the results of the comparing.

The present invention also provides a computer program product usable with a programmable computer having readable program code embodied therein of analyzing electronic documents in an intranet. In an exemplary embodiment, the computer program product includes (1) computer readable code for crawling HTML content and text content in a set of the sites, (2) computer readable code for deep-scanning non-HTML content and non-text content in the set of sites, (3) computer readable code for reverse-scanning the set of sites, (4) computer readable code for performing a semantic analysis of the crawled content and the deep-scanned content, (5) computer readable code for correlating the results of the semantic analysis with the results of the reverse-scanning, and (6) computer readable code for comparing user navigation patterns and content from the members of the set of sites.

In an exemplary embodiment, the computer program product includes (1) computer readable code for crawling HTML content and text content in a set of the sites, (2) computer readable code for deep-scanning non-HTML content and non-text content in the set of sites, (3) computer readable code for reverse-scanning the set of sites, (4) computer readable code for performing a semantic analysis of the crawled content and the deep-scanned content, (5) computer readable code for correlating the results of the semantic analysis with the results of the reverse-scanning, (6) computer readable code for comparing user navigation patterns and content from the members of the set of sites, and (7) computer readable code for combining the results of the performing, the results of the correlating, and the results of the comparing.

THE FIGURES

DETAILED DESCRIPTION OF THE INVENTION

The present invention provides a method, system, and service of analyzing electronic documents in an intranet, where the intranet includes a plurality of web sites. In an exemplary embodiment, the method, system, and service include (1) crawling HTML content and text content in a set of the sites, (2) deep-scanning non-HTML content and non-text content in the set of sites, (3) reverse-scanning the set of sites, (4) performing a semantic analysis of the crawled content and the deep-scanned content, (5) correlating the results of the semantic analysis with the results of the reverse-scanning, and (6) comparing user navigation patterns and content from the members of the set of sites. In a further embodiment, the method, system, and service further include combining the results of the performing, the results of the correlating, and the results of the comparing.

Figure 1:
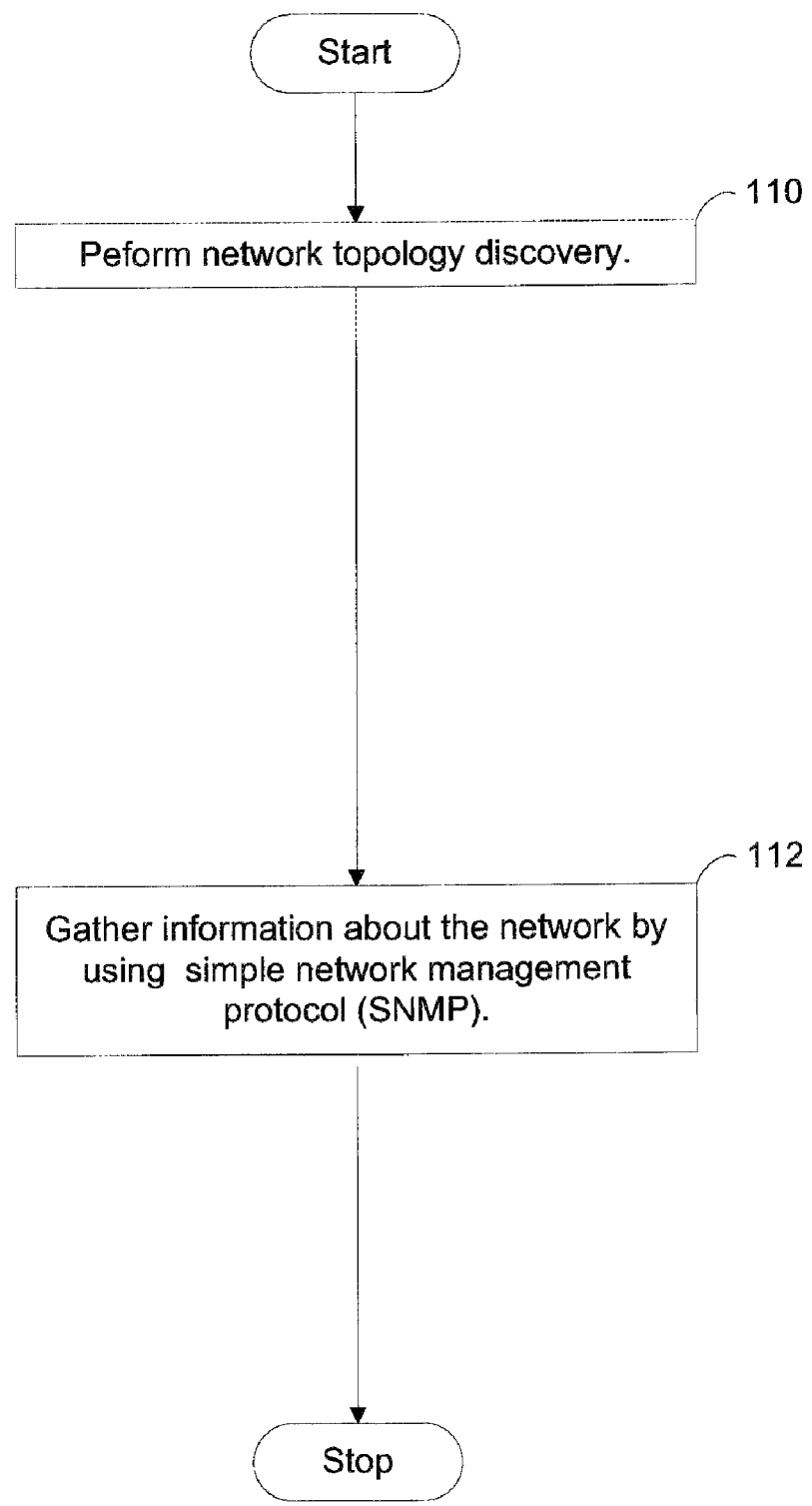
FIG. 1 is a flowchart of a prior art technique.
Figure 2A:
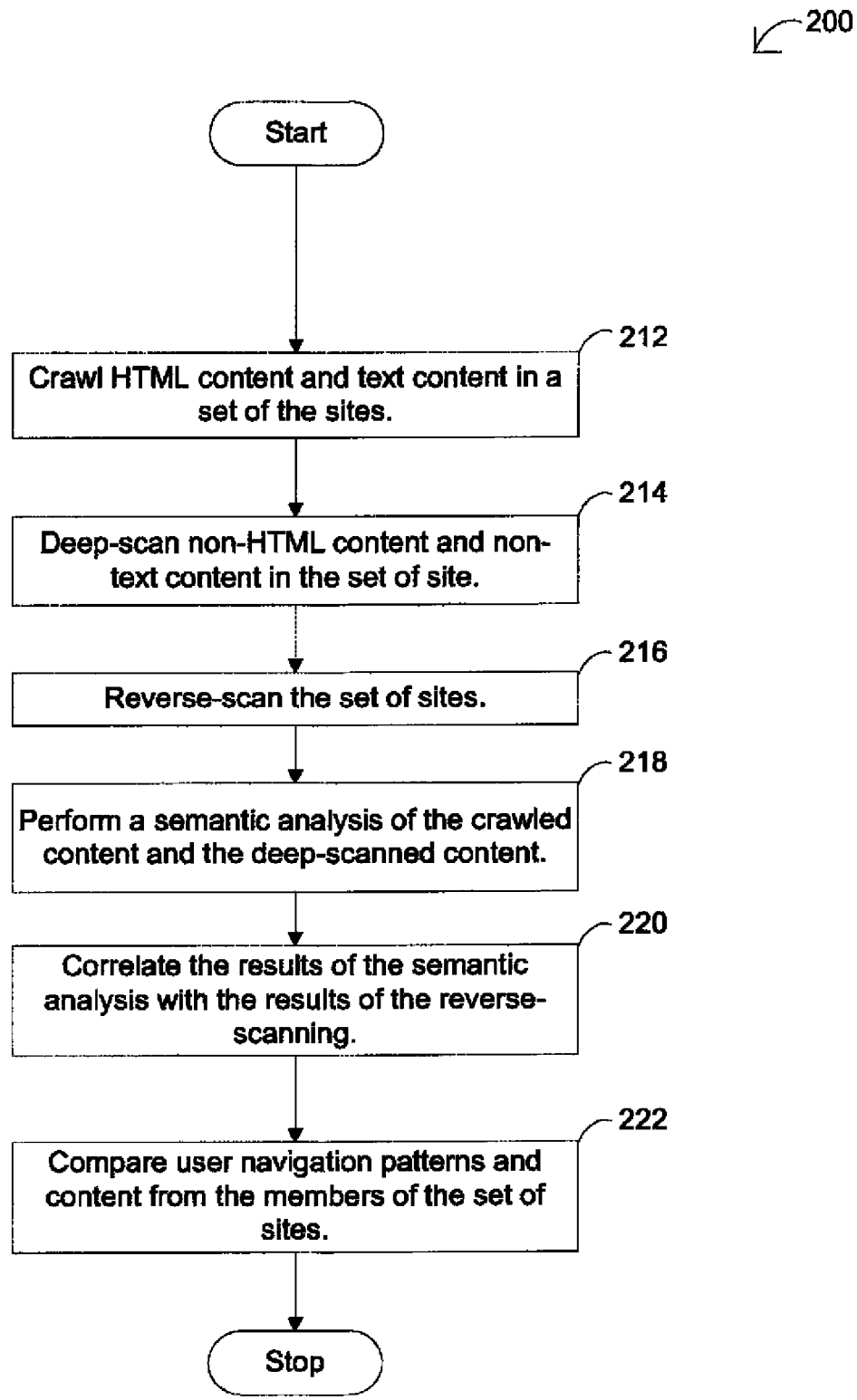
FIG. 2A is a flowchart in accordance with an exemplary embodiment of the present invention.
Figure 2B:
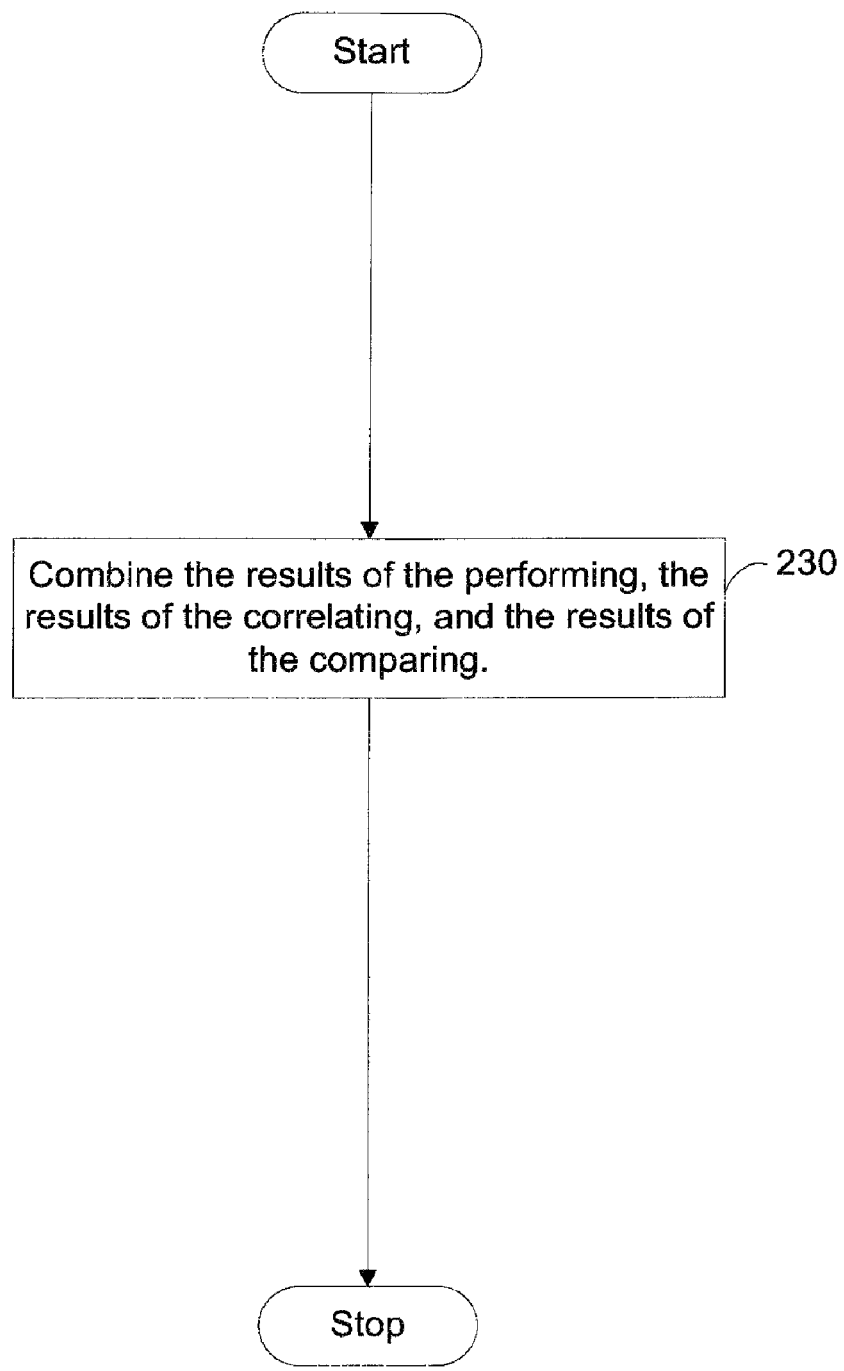
FIG. 2B is a flowchart in accordance with a further embodiment of the present invention.

Referring to FIG. 2A, in an exemplary embodiment, the present invention includes a step 212 of crawling HTML content and text content in a set of the sites, a step 214 of deep-scanning non-HTML content and non-text content in the set of sites, a step 216 of reverse-scanning the set of sites, a step 218 of performing a semantic analysis of the crawled content and the deep-scanned content, a step 220 of correlating the results of the semantic analysis with the results of the reverse-scanning, and a step 222 of comparing user navigation patterns and content from the members of the set of sites. Referring next to FIG. 2B, in a further embodiment, the present invention further includes a step 230 of combining the results of the performing, the results of the correlating, and the results of the comparing.

In an exemplary embodiment, the method, system, and service include (1) crawling HTML content and text content in a set of the sites, (2) deep-scanning non-HTML content and non-text content in the set of sites, (3) reverse-scanning the set of sites, (4) performing a semantic analysis of the crawled content and the deep-scanned content, (5) correlating the results of the semantic analysis with the results of the reverse-scanning, (6) comparing user navigation patterns and content from the members of the set of sites, and (7) combining the results of the performing, the results of the correlating, and the results of the comparing.

Figure 2C:
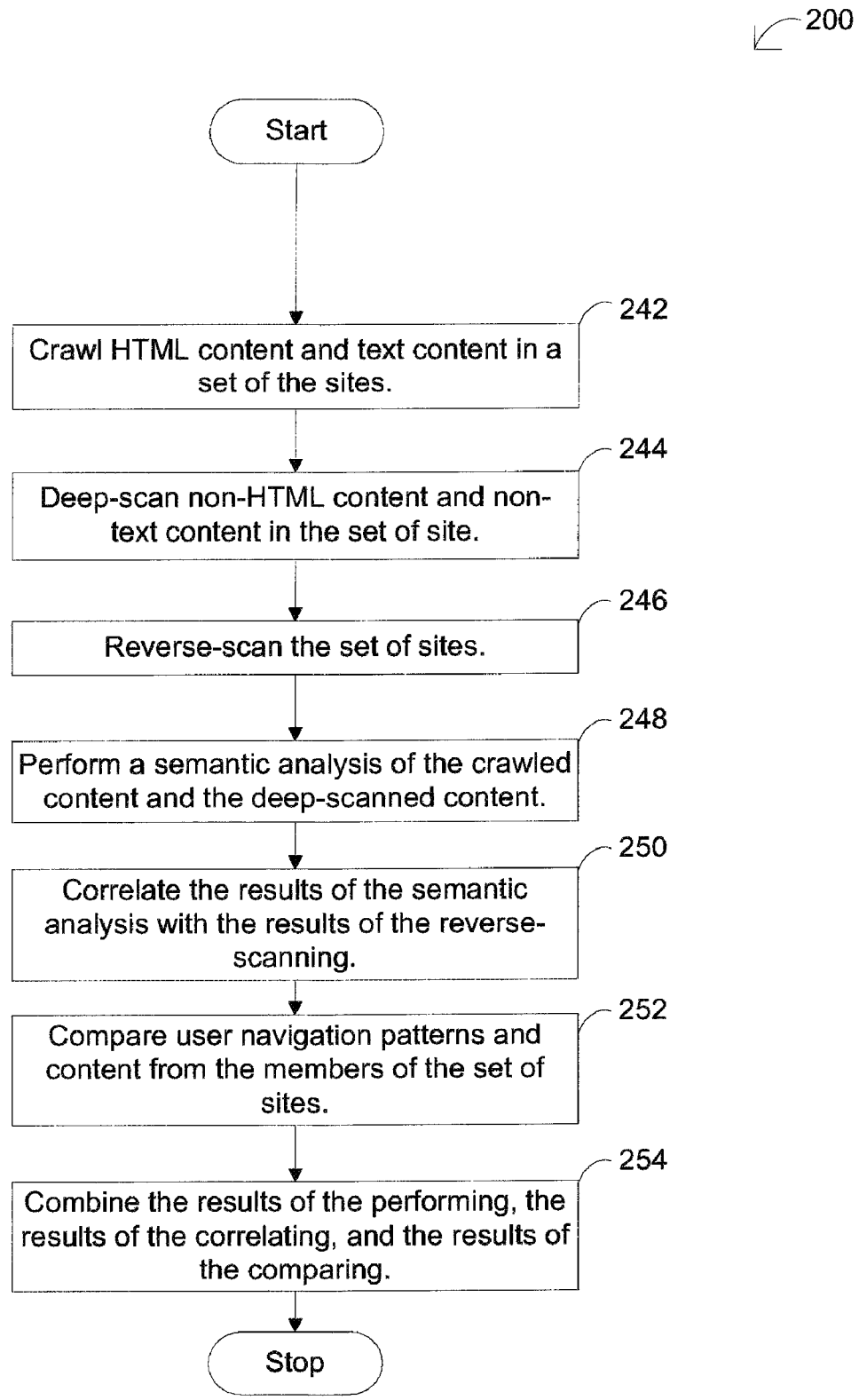
FIG. 2C is a flowchart in accordance with an exemplary embodiment of the present invention.

Referring to FIG. 2C, in an exemplary embodiment, the present invention includes a step 242 of crawling HTML content and text content in a set of the sites, a step 244 of deep-scanning non-HTML content and non-text content in the set of sites, a step 246 of reverse-scanning the set of sites, a step 248 of performing a semantic analysis of the crawled content and the deep-scanned content, a step 250 of correlating the results of the semantic analysis with the results of the reverse-scanning, a step 252 of comparing user navigation patterns and content from the members of the set of sites, and step 254 of combining the results of the performing, the results of the correlating, and the results of the comparing.

Crawling

In an exemplary embodiment, crawling step 212 includes fetching documents from web sites in the intranet. Crawling step 212 includes crawling all HTML and text pages from the intranet (i.e. enterprise) web-sites, while honoring standard internet crawling practices (e.g. politeness, robots.txt, meta-tags such as no-index, no-follow). As each crawled document can contain links to other documents that may possibly be on different sites, crawling step 212 crawls only the set of sites targeted for analysis.

Crawling step 212 further includes (a) writing each crawled document to a file-based storage system and (b) annotating each crawled document. In an exemplary embodiment, the annotating includes de-tagging the document, generating hash and shingle values based on document content, determining domains, and/or determining sub-domains.

Once the annotating is complete, crawling step 212 generates the following 4-tuple entry for each annotated document:

Document-id Hash-value Size Domain/Sitename.

The tuple is used in performing step 218 (e.g., in duplicate analysis). Additionally, crawling step 212 writes the URLs crawled for each of the targeted sites to a central list for use in reverse-scanning step 216.

Deep-Scanning

Figure 3:
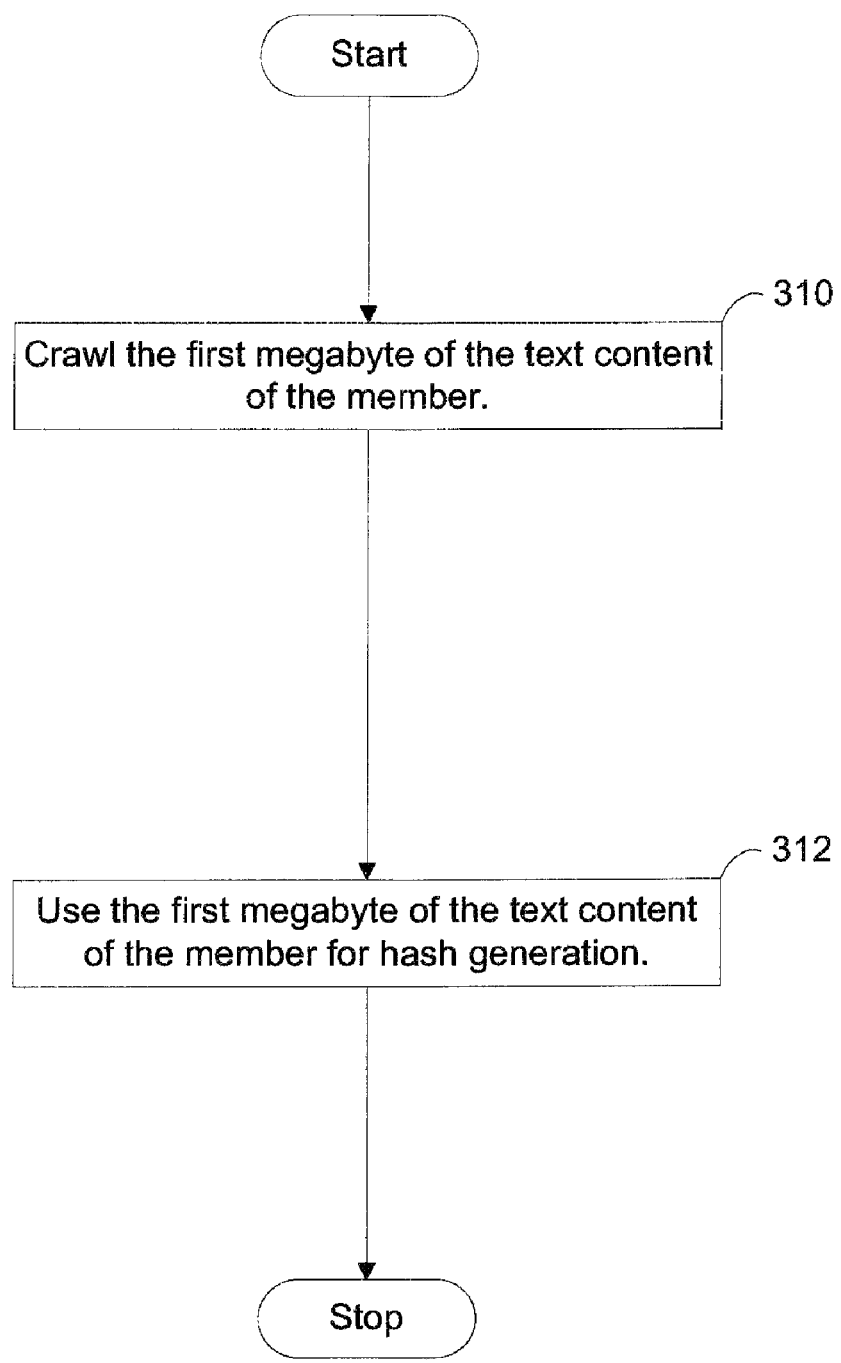
FIG. 3 is a flowchart of the deep-scanning step in accordance with an exemplary embodiment of the present invention.

Referring to FIG. 3, in an exemplary embodiment, if the text content for a member of the set of sites is greater than one megabyte, deep-scanning step 214 includes a step 310 of crawling the first megabyte of the text content of the member and a step 312 of using the first megabyte of the text content of the member for hash generation. In an exemplary embodiment, the deep-scanning fetches all static non-HTML content and non-text content (e.g., .pdf files, images, .exe files, Microsoft PowerPoint files) from the sites. For each URL fetched by deep-scanning, a tuple similar to the one generating in crawling step 212 is generated for duplicate analysis. In addition, the URL is written to a central list for reverse-scanning step 216.

Reverse-Scanning

Figure 4:
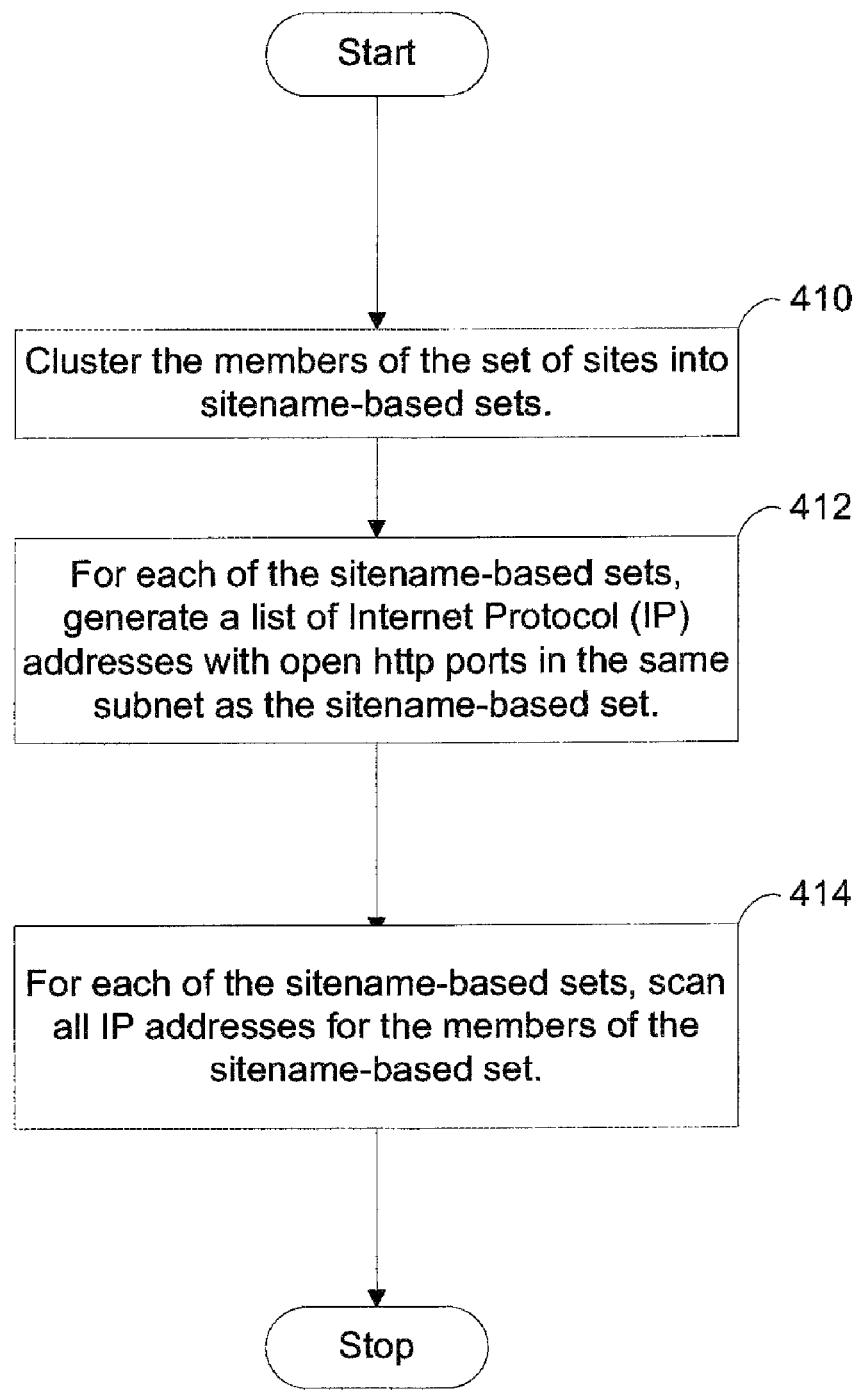
FIG. 4 is a flowchart of the reverse-scanning step in accordance with an exemplary embodiment of the present invention.

Referring to FIG. 4, in an exemplary embodiment, reverse-scanning step 216 includes a step 410 of clustering the members of the set of sites into sitename-based sets, a step 412 of, for each of the sitename-based sets, generating a list of Internet Protocol (IP) addresses with open http ports in the same subnet as the sitename-based set, and a step 414 of, for each of the sitename-based sets, scanning all IP addresses for the members of the sitename-based set. In an exemplary embodiment, reverse-scanning step 216 (a) takes a set of URLs and another set of IP addresses and (b) scans the set of IP addresses using the URLs to determine content overlap with the given URL set. Thus, for each URL-IP pair thus formed, a content hash is generated and compared against the content hash from the original URL.

In an exemplary embodiment, reverse-scanning step 216 fetches content from the sites in the same subnet as the targeted sites in order to perform an "intra-server" duplicate analysis. In an exemplary embodiment, reverse-scanning step 216 (a) checks for servers with open http ports in the same subnet as the targeted sites and (b) then makes GET calls to these http sites for the HTML pages that were found on the targeted servers (by replacing the sitename in the original URL with the sitename of the http site).

Performing

Figure 5A:
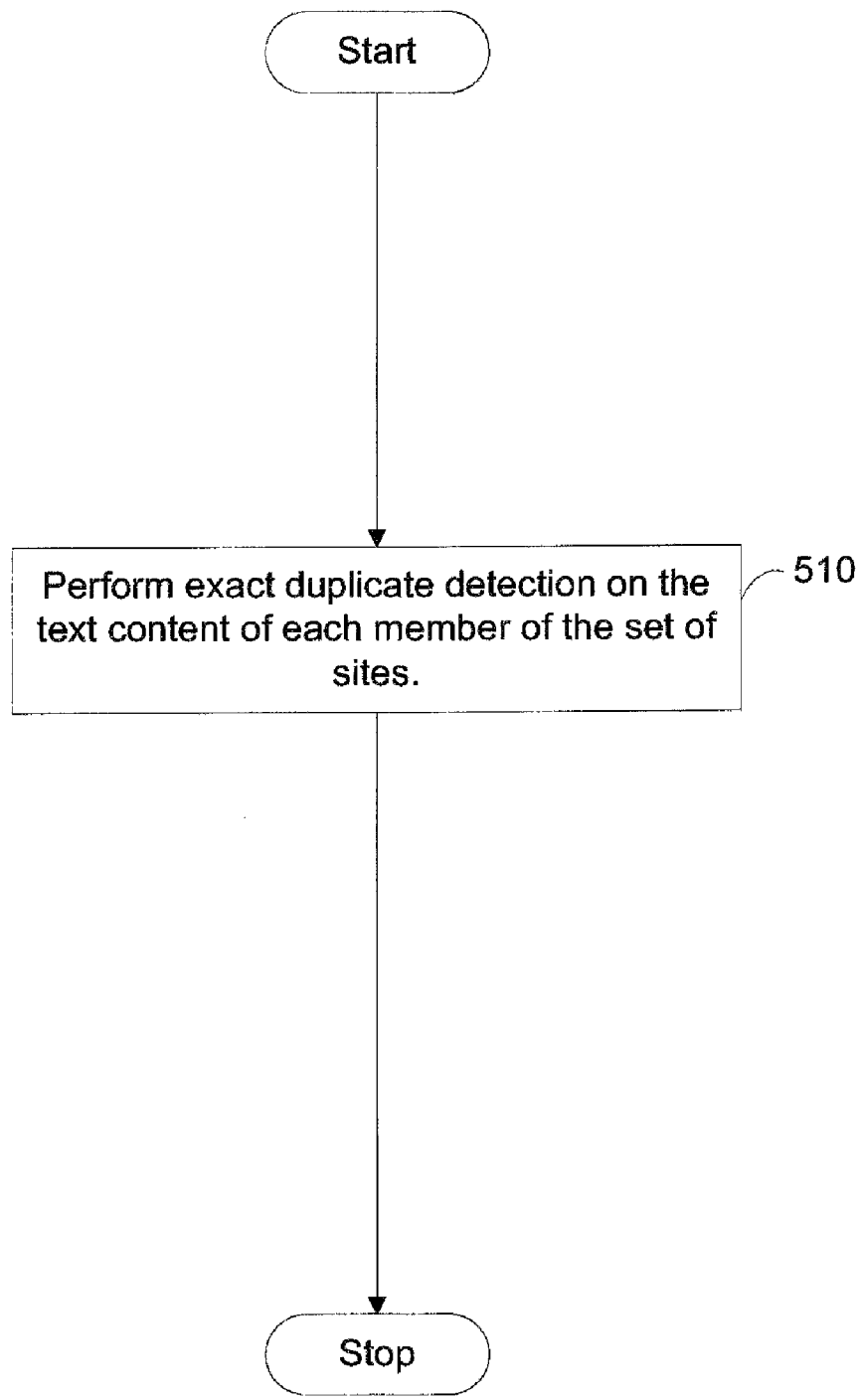
FIG. 5A is a flowchart of the performing step in accordance with an exemplary embodiment of the present invention.
Figure 5B:
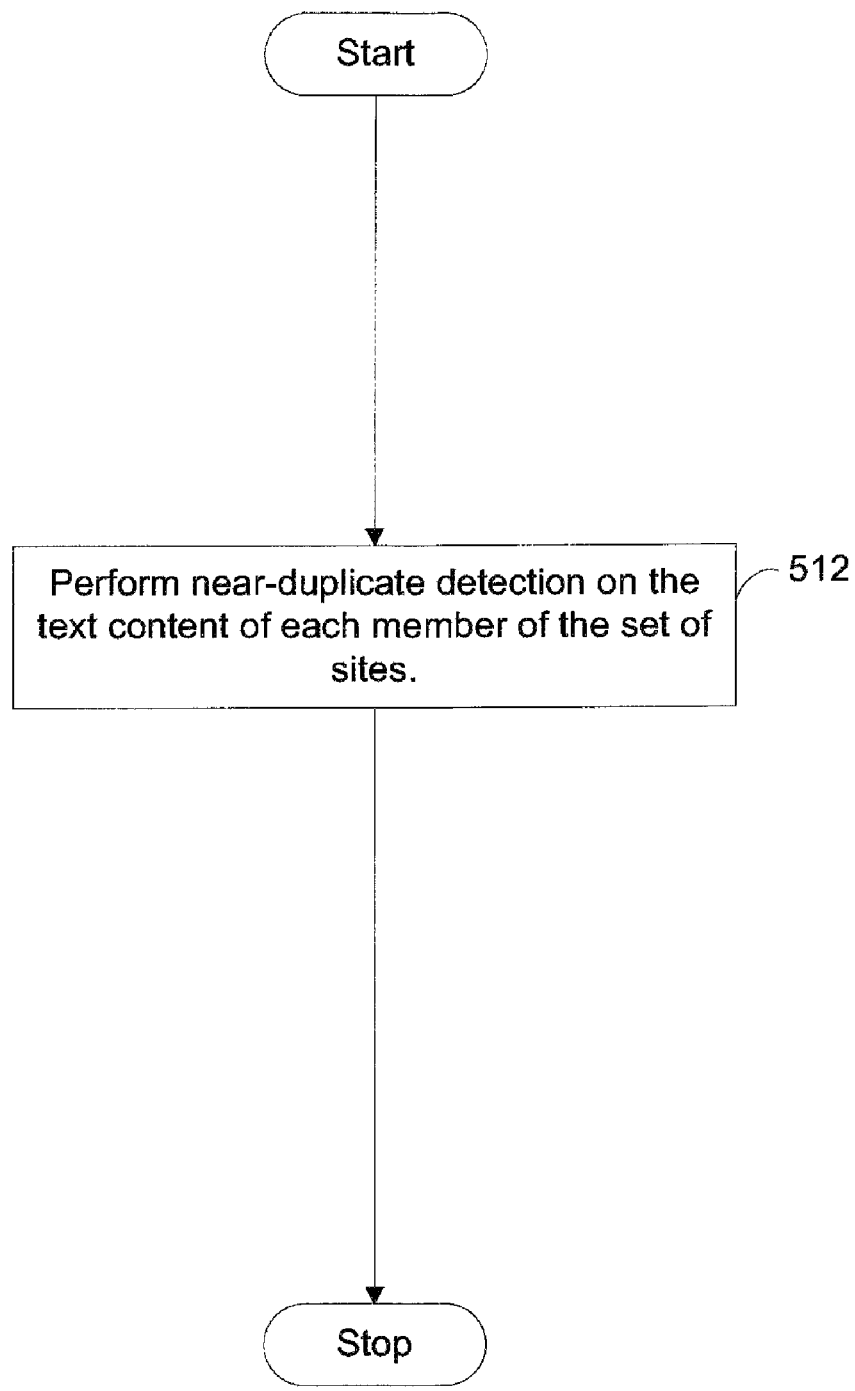
FIG. 5B is a flowchart of the performing step in accordance with an exemplary embodiment of the present invention.

Referring to FIG. 5A, in an exemplary embodiment, performing step 218 includes a step 510 of performing exact duplicate detection on the text content of each member of the set of sites. In an exemplary embodiment, performing step 510 includes generating hash-values for the text content of each member of the set of sites and comparing these hash-values against each other. Referring to FIG. 5B, in an exemplary embodiment, performing step 218 includes a step 512 of performing near-duplicate detection on the text content of each member of the set of sites. In an exemplary embodiment, performing step 512 includes employing the near-duplicate detection technique described at the following URL:

http://www.informatik.uni-trier.de/~ley/db/conf/cpm/cpm2000.html#Broder00

Figure 5C:
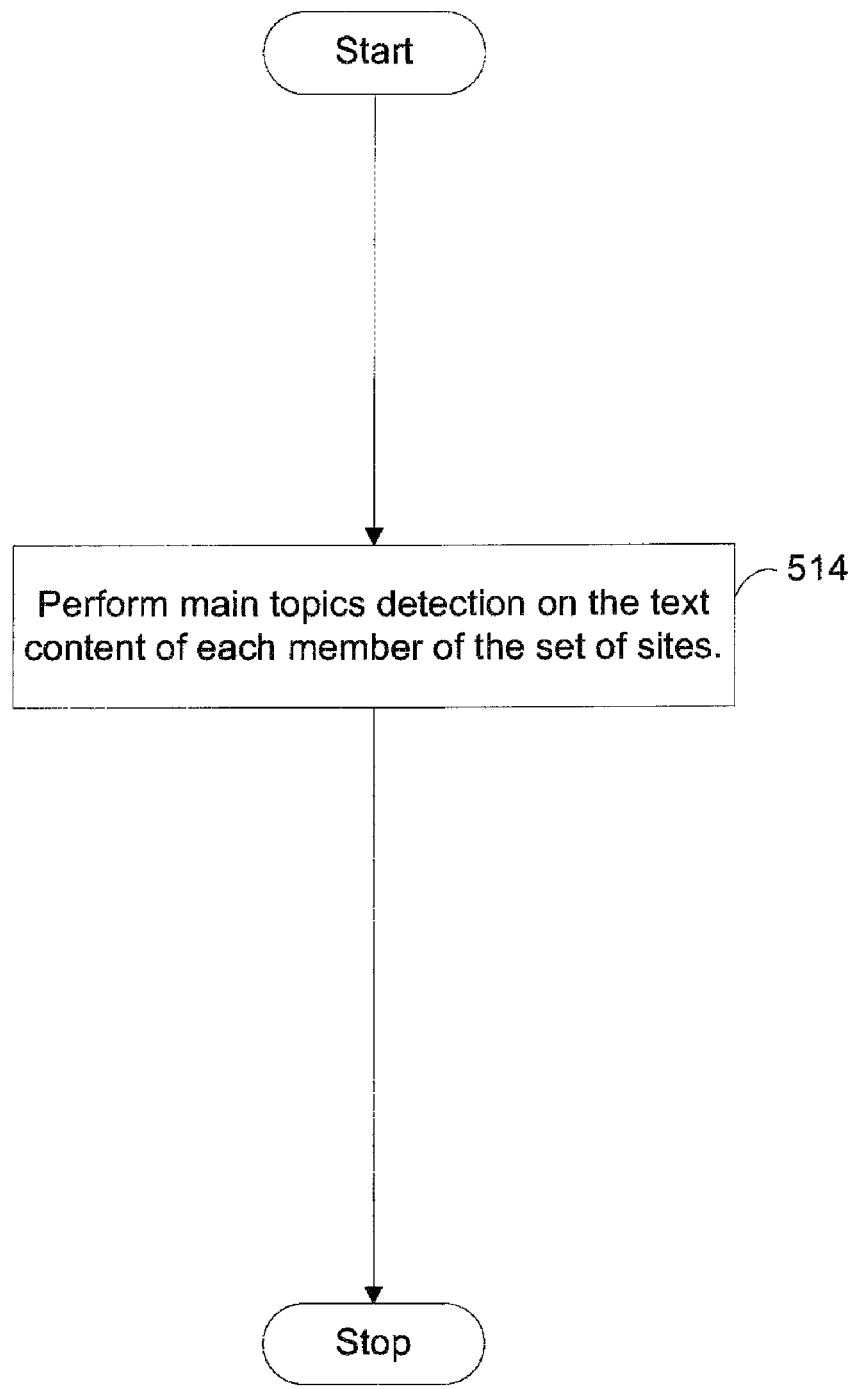
FIG. 5C is a flowchart of the performing step in accordance with an exemplary embodiment of the present invention.
Figure 5D:
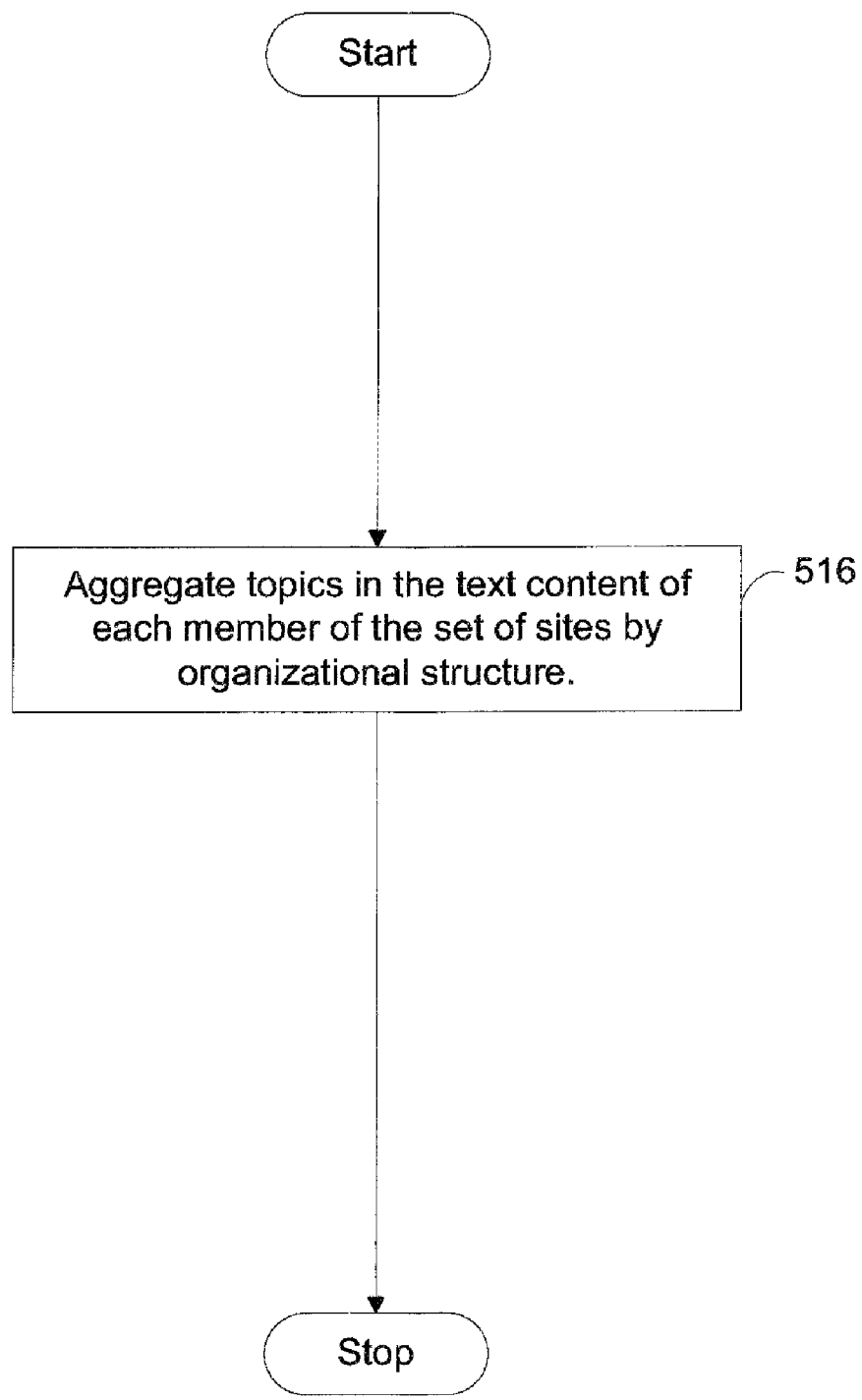
FIG. 5D is a flowchart of the performing step in accordance with an exemplary embodiment of the present invention.

Referring to FIG. 5C, in an exemplary embodiment, performing step 218 includes a step 514 of performing main topics detection on the text content of each member of the set of sites. In an exemplary embodiment, performing step 514 includes employing term identification techniques, classification techniques, and tfidf (term-frequency inverse document frequency) techniques. Referring to FIG. 5D, in an exemplary embodiment, performing step 218 includes a step 516 of aggregating topics in the text content of each member of the set of sites by organizational structure.

In an exemplary embodiment, performing step 218 (a) merges the set of tuples generated during crawling step 212 and deep-scanning step 214 and (b) compares the content hashes for each page on a site against pages from all other sites.

Correlating

In an exemplary embodiment, correlating step 220 includes correlating user navigation patterns from standard website analysis metrics and specific content from domains and reverse scanned site.

Combining

Figure 6:
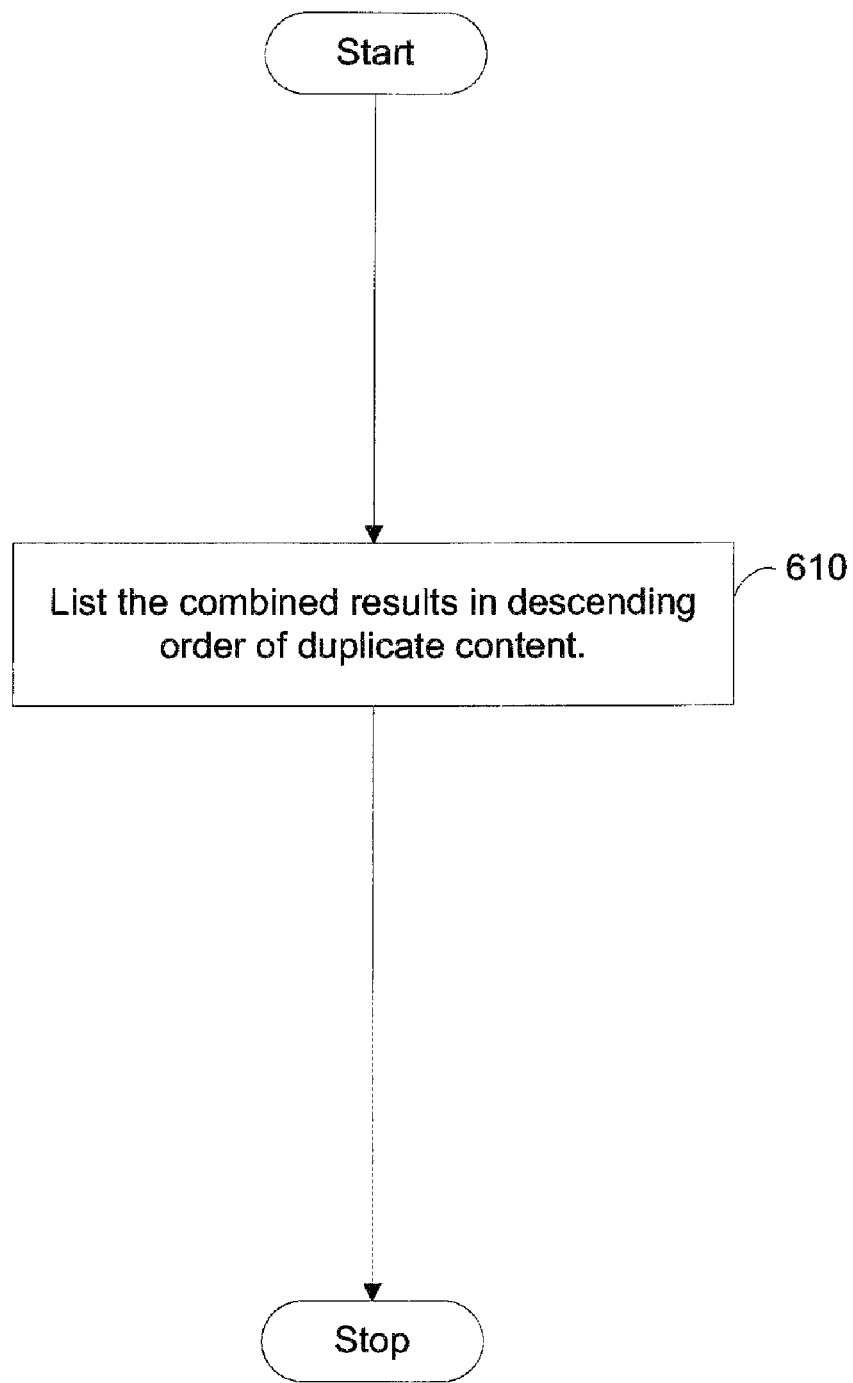
FIG. 6 is a flowchart of the computing step in accordance with an exemplary embodiment of the present invention.

Referring to FIG. 6 in an exemplary embodiment, combining step 230 includes a step 610 of listing the combined results in descending order of duplicate content. In an exemplary embodiment, listing step 610 generates an overlap report that contains information about the amount of overlap on each of the sites scanned. Additionally, the data from reverse-scanning of each site is added to the information of each site. The overlap report thus produced lists all sites in descending order of content that is overlapped.

In an exemplary embodiment, listing step 610 generates the overlap report for each site, where the overlap reports depicts the amount of duplicate content on that site, and the list of sites with which content is duplicated.

Conclusion

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of analyzing electronic documents in an intranet, wherein the intranet comprises a plurality of web sites, the method comprising:
    crawling HTML content and text content in a set of the sites, wherein the crawling comprises
        writing each crawled content to a file-based storage system,
        annotating each crawled content, and
        generating a first 4-tuple entry for each annotated, crawled content;
    deep-scanning non-HTML content and non-text content in the set of sites, wherein the deep-scanning comprises fetching all static non-HTML content and non-text content in the set of sites and generating a second 4-tuple entry;
    reverse-scanning the set of sites;
    performing a semantic analysis of the crawled content and the deep-scanned content by using the first 4-tuple entry and the second 4-tuple entry;
    correlating the results of the semantic analysis with the results of the reverse-scanning; and
    comparing user navigation patterns and content from members of the set of sites.

2. The method of claim 1 further comprising combining the results of the performing, the results of the correlating, and the results of the comparing.

3. The method of claim 1 wherein, if the text content for a member of the set of sites is greater than one megabyte, the deep-scanning comprises:
    crawling the first megabyte of the text content of the member; and
    using the first megabyte of the text content of the member for hash generation.

4. The method of claim 1 wherein the performing comprises performing exact duplicate detection on the text content of each member of the set of sites.

5. The method of claim 1 wherein the performing comprises performing near-duplicate detection on the text content of each member of the set of sites.

6. The method of claim 1 wherein the performing comprises performing main topics detection on the text content of each member of the set of sites.

7. The method of claim 1 wherein the performing comprises aggregating topics in the text content of each member of the set of sites by organizational structure.

8. The method of claim 2 wherein the combining comprises listing the combined results in descending order of duplicate content.

9. A method of providing a service to analyze electronic documents in an intranet, wherein the intranet comprises a plurality of web sites, the method comprising:
   crawling HTML content and text content in a set of the sites, wherein the crawling comprises
      writing each crawled content to a file-based storage system,
      annotating each crawled content, and
      generating a first 4-tuple entry for each annotated, crawled content;
   deep-scanning non-HTML content and non-text content in the set of sites, wherein the deep-scanning comprises fetching all static non-HTML content and non-text content in the set of sites and generating a second 4-tuple entry;
   reverse-scanning the set of sites;
   performing a semantic analysis of the crawled content and the deep-scanned content by using the first 4-tuple entry and the second 4-tuple entry;
   correlating the results of the semantic analysis with the results of the reverse-scanning; and
   comparing user navigation patterns and content from members of the set of sites.

10. The method of claim 9 further comprising combining the results of the performing, the results of the correlating, and the results of the comparing.

11. The method of claim 9 wherein, if the text content for a member of the set of sites is greater than one megabyte, the deep-scanning comprises:
   crawling the first megabyte of the text content of the member; and
   using the first megabyte of the text content of the member for hash generation.

12. The method of claim 9 wherein the performing comprises performing exact duplicate detection on the text content of each member of the set of sites.

13. The method of claim 9 wherein the performing comprises performing near-duplicate detection on the text content of each member of the set of sites.

14. The method of claim 9 wherein the performing comprises performing main topics detection on the text content of each member of the set of sites.

15. The method of claim 9 wherein the performing comprises aggregating topics in the text content of each member of the set of sites by organizational structure.

16. The method of claim 10 wherein the combining comprises listing the combined results in descending order of duplicate content.

17. A method of analyzing electronic documents in an intranet, wherein the intranet comprises a plurality of web sites, the method comprising:
   crawling HTML content and text content in a set of the sites, wherein the crawling comprises
      writing each crawled content to a file-based storage system,
      annotating each crawled content, and
      generating a first 4-tuple entry for each annotated, crawled content;
   deep-scanning non-HTML content and non-text content in the set of sites, wherein the deep-scanning comprises fetching all static non-HTML content and non-text content in the set of sites and generating a second 4-tuple entry;
   reverse-scanning the set of sites;
   performing a semantic analysis of the crawled content and the deep-scanned content by using the first 4-tuple entry and the second 4-tuple entry;
   correlating the results of the semantic analysis with the results of the reverse-scanning;
   comparing user navigation patterns and content from members of the set of sites; and
   combining the results of the performing, the results of the correlating, and the results of the comparing.

18. The method of claim 17 wherein, if the text content for a member of the set of sites is greater than one megabyte, the deep-scanning comprises:
   crawling the first megabyte of the text content of the member; and
   using the first megabyte of the text content of the member for hash generation.

19. The method of claim 17 wherein the performing comprises performing exact duplicate detection on the text content of each member of the set of sites.

20. The method of claim 17 wherein the performing comprises performing near-duplicate detection on the text content of each member of the set of sites.

21. The method of claim 17 wherein the performing comprises performing main topics detection on the text content of each member of the set of sites.

22. The method of claim 17 wherein the performing comprises aggregating topics in the text content of each member of the set of sites by organizational structure.

* * * * *